(12) United States Patent
Lee et al.

(10) Patent No.: US 7,467,393 B2
(45) Date of Patent: Dec. 16, 2008

(54) SLIM-TYPE RECORDING AND REPRODUCING APPARATUS HAVING POSITIONING STRUCTURE FOR POSITIONING A TRAY THEREIN

(75) Inventors: In-Shuen Lee, Hinchu (TW); Chih-Chung Hsieh, Hinchu (TW); Chun-Jen Tseng, Hinchu (TW); Jeng-Wen Huang, Hinchu (TW); Jung-Fu Chen, Hinchu (TW)

(73) Assignee: LITE-ON IT Corporation, Taipei (TW)

( * ) Notice: Subject to any disclaimer, the term of this patent is extended or adjusted under 35 U.S.C. 154(b) by 464 days.

(21) Appl. No.: 11/330,256

(22) Filed: Jan. 12, 2006

(65) Prior Publication Data

US 2006/0294529 A1 Dec. 28, 2006

(30) Foreign Application Priority Data

Jun. 24, 2005 (TW) .............................. 94121268 A

(51) Int. Cl.
*G11B 17/056* (2006.01)
*G11B 17/04* (2006.01)

(52) U.S. Cl. ...................................... 720/610; 720/601

(58) Field of Classification Search .................. 720/601, 720/609, 610
See application file for complete search history.

(56) References Cited

U.S. PATENT DOCUMENTS

| 7,165,261 B2 * | 1/2007 | Chen | 720/610 |
| 2003/0142610 A1 * | 7/2003 | Yeh et al. | 369/75.2 |
| 2003/0227855 A1 * | 12/2003 | Chen | 369/75.2 |
| 2004/0221300 A1 * | 11/2004 | Chen | 720/610 |
| 2005/0010937 A1 * | 1/2005 | Chen et al. | 720/610 |
| 2007/0067782 A1 * | 3/2007 | Yang | 720/610 |

* cited by examiner

*Primary Examiner*—William J Klimowicz
(74) *Attorney, Agent, or Firm*—Ming Chow Sinorica, LLC

(57) ABSTRACT

A recording and reproducing apparatus includes a tray disposed within an outer casing and movable along a tray moving direction between retracted and extended positions. A positioning structure includes a locking member fixed on the outer casing, and a support member for immobilizing the locking member with respect to the outer casing in such a manner that the locking member extends upwardly into the outer casing to prevent movement of the tray with respect to the outer casing. A protrusion portion of the outer casing surrounding the locking member and extending in the moving direction defines the support member.

7 Claims, 6 Drawing Sheets

SLIM-TYPE RECORDING AND REPRODUCING APPARATUS HAVING POSITIONING STRUCTURE FOR POSITIONING A TRAY THEREIN

FIELD OF THE INVENTION

The present invention relates to a positioning structure, more particularly to a positioning structure for use in a slim-type recording and reproducing apparatus. The positioning structure is used for positioning the disk-carrying tray stationarily within the recording and reproducing apparatus.

BACKGROUND OF THE INVENTION

A conventional recording and reproducing apparatus of slim-type is generally installed within a portable computer, such as a notebook computer. Thus, production of recording and reproducing apparatus plays a major role in the computer industry.

The main object of the manufacturer is to find a way to reduce the volume or size of the recording and reproducing apparatus during the development thereof so as to facilitate in the carrying along or storage.

FIG. 1 shows a bottom side view of a conventional recording and reproducing apparatus 10 of slim-type, and includes an outer casing 5, and a disk-carrying tray 12 mounted within the outer casing 5. The tray 12 is movable with respect to the outer casing 5 between a retracted position, in which the tray 12 is retracted into the outer casing 5 to permit reading of a disk supported on the tray 12, and an extended position, in which the tray 12 is protruded outwardly from the outer casing 5.

The tray 12 is formed with a guiding groove 13. A locking device 16 is used in the conventional recording and reproducing apparatus 10 in order to position the tray 12 stationarily at the retracted position. The locking device 16 includes a locking member 2 and a lock-fastening member 14. The lock-fastening member 14 is fixed to the tray 12 adjacent to a front end thereof, and has a hooking part for engaging the locking member 2.

Referring to FIG. 2, a pin 4 serves as the locking member 2, and includes a head 402 fixed with a hole in a bottom part 6 of the outer casing 5 and a pillar portion 404 extending into the guiding groove 13 so as to permit sliding over and engaging the hooking part of the lock fastening member 14 when the tray 12 is disposed at the retracted position. Under this condition, the tray 12 is prevented from moving to the extended position. In the event, the tray 12 is required to be ejected, the lock-fastening member 14 is activated to remove the hooking part from the pillar portion 404, resulting in disengagement between the pillar portion 404 of the pin 4 and the hooking part, thereby permitting the tray 12 to move from the retracted position to the extended position.

Some disadvantages resulting from the use of the conventional recording and reproducing apparatus are as follows:

The periphery portion of the hole in the bottom part 6 and surrounding the pillar portion 404 of the pin 4 is subjected to be deformed in the D1 direction due to the collision of the hooking part of the lock-fastening member 14 in the f direction, thereby loosening of the pin 4 with respect to the bottom part 6, especially in a shock test. Because the tray 12 is positioned in the outer casing 5 by engagement between the pin 4 and the hooking part of the lock-fastening member 14 only, the hooking part exerts a relatively large force on pin 4 at the tray moving direction in order to oppose the ejecting force to eject the tray 12 from the outer casing 5 during the shock test. Therefore, the pillar portion 404 may easily loose from the bottom part 6 of the outer casing 5 when the latter suffers from shock test.

SUMMARY OF THE INVENTION

The object of the present invention is to provide a slim-type optical recording and reproducing apparatus having positioning structure to overcome the aforesaid disadvantages encountered during use of the conventional recording and reproducing apparatus.

In one aspect of the present invention, a positioning structure is provided for use in a device to prevent movement of a movable member therein. The device includes an outer casing receiving the movable member therein. The positioning structure includes: a locking member adapted to be fixed on the outer casing; and a support member for immobilizing the locking member with respect to the outer casing in such a manner that the locking member extends upwardly into the outer casing to prevent movement of the movable member with respect to the outer casing; wherein, a protrusion portion of the outer casing surrounding the locking member and extending in a moving direction of the movable member defines the support member.

In a second aspect of the present invention, an optical recording and reproducing apparatus is provided to include: an outer casing having a tray-receiving compartment and an entrance for access into the compartment, the outer casing further defining a tray moving direction; a tray disposed within the outer casing and movable along the tray moving direction between a retracted position, in which the tray is retracted into the outer casing, and an extended position, in which the tray is protruded outwardly from the outer casing via the entrance; and a positioning structure. The positioning structure includes: a locking member fixed on the outer casing, and a support member for immobilizing the locking member with respect to the outer casing in such a manner that the locking member extends upwardly into the outer casing to prevent movement of the tray with respect to the outer casing, thereby positioning the tray stationarily at the retracted position, wherein, a protrusion portion of the outer casing surrounding the locking member and extending in the moving direction defines the support member.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 1:
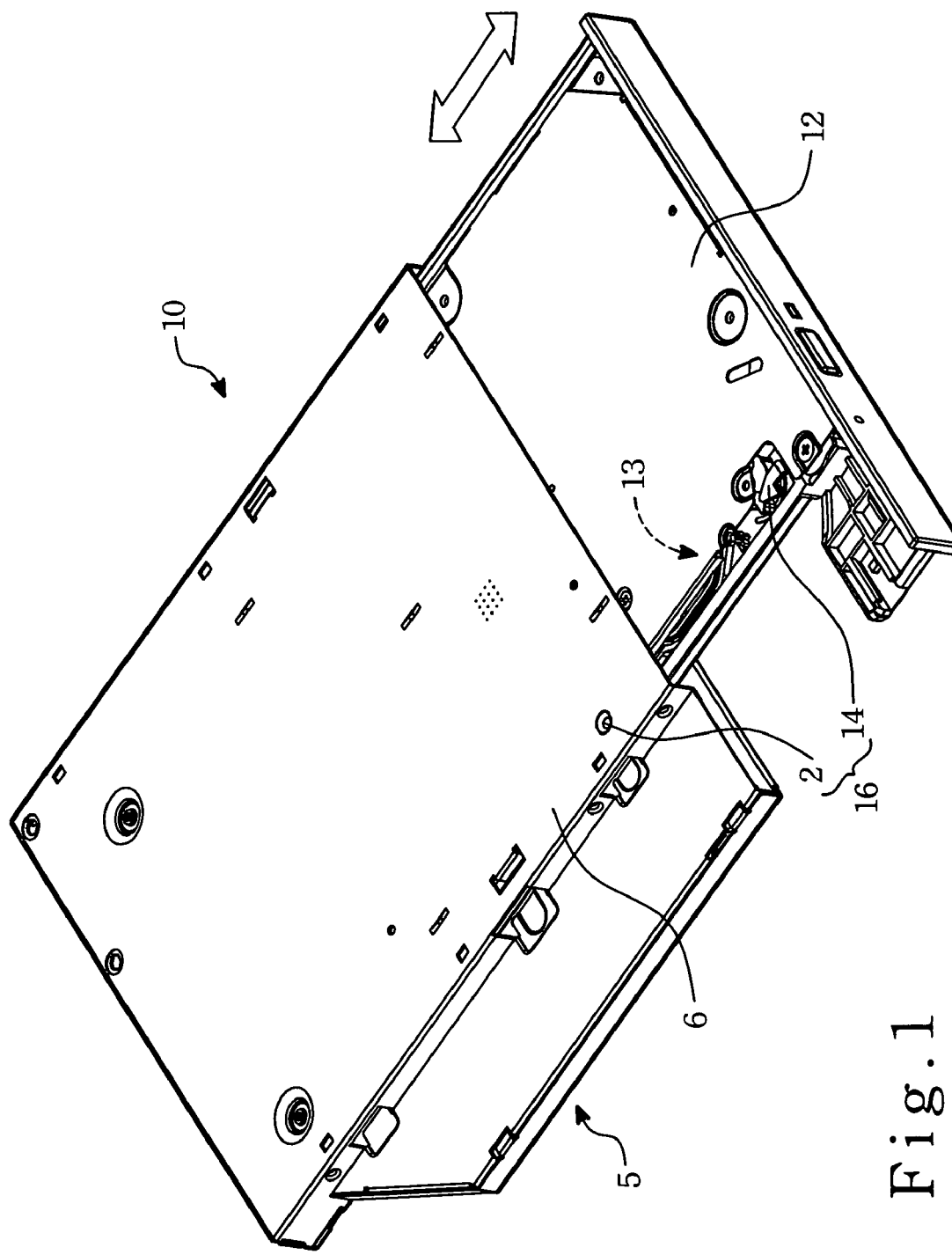
FIG. 1 is a bottom side view of a conventional optical recording and reproducing apparatus of slim-type.
Figure 2:
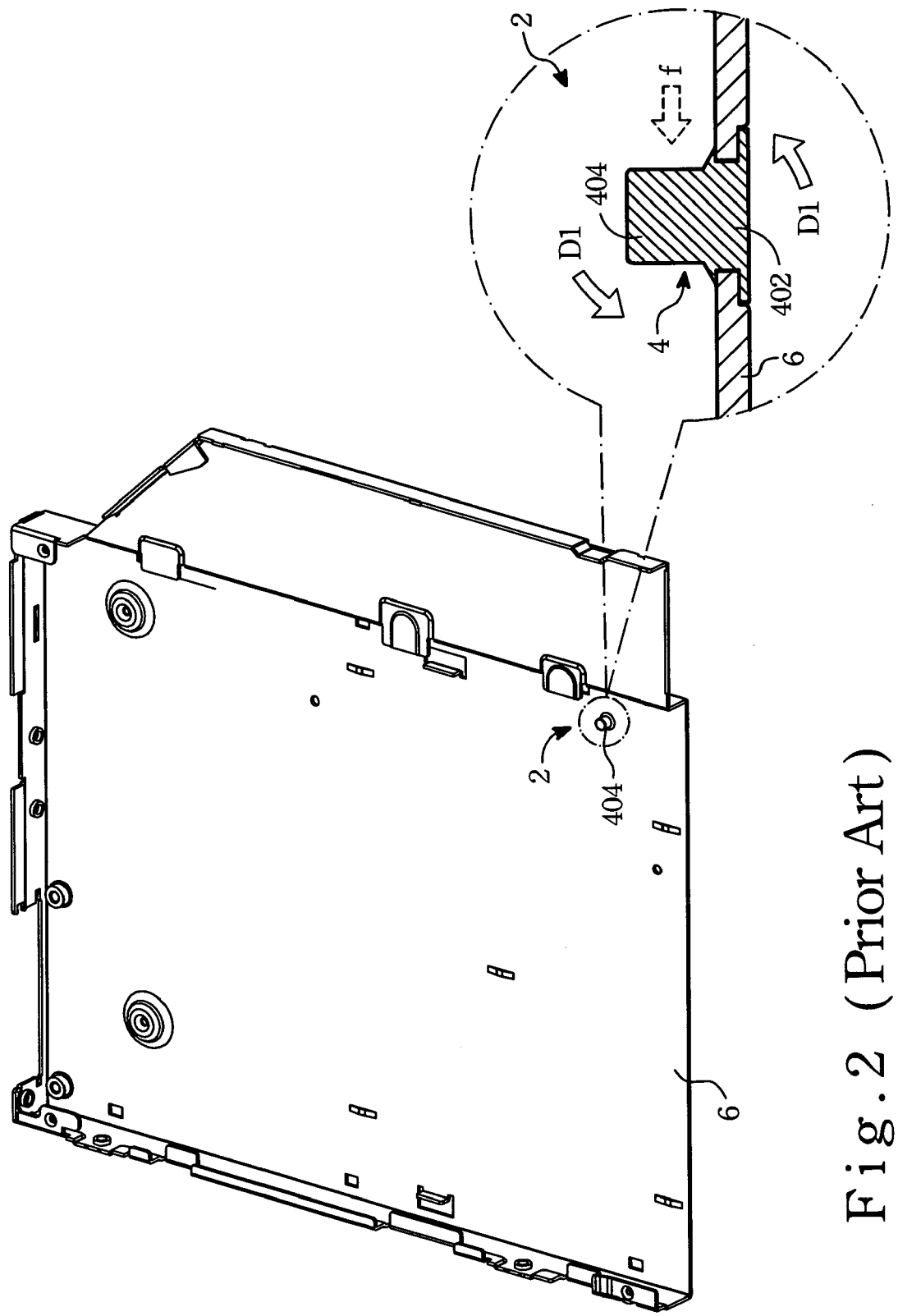
FIG. 2 is a partly exploded and enlarged view illustrating a positioning structure of the conventional optical recording and reproducing apparatus.
Figure 3:
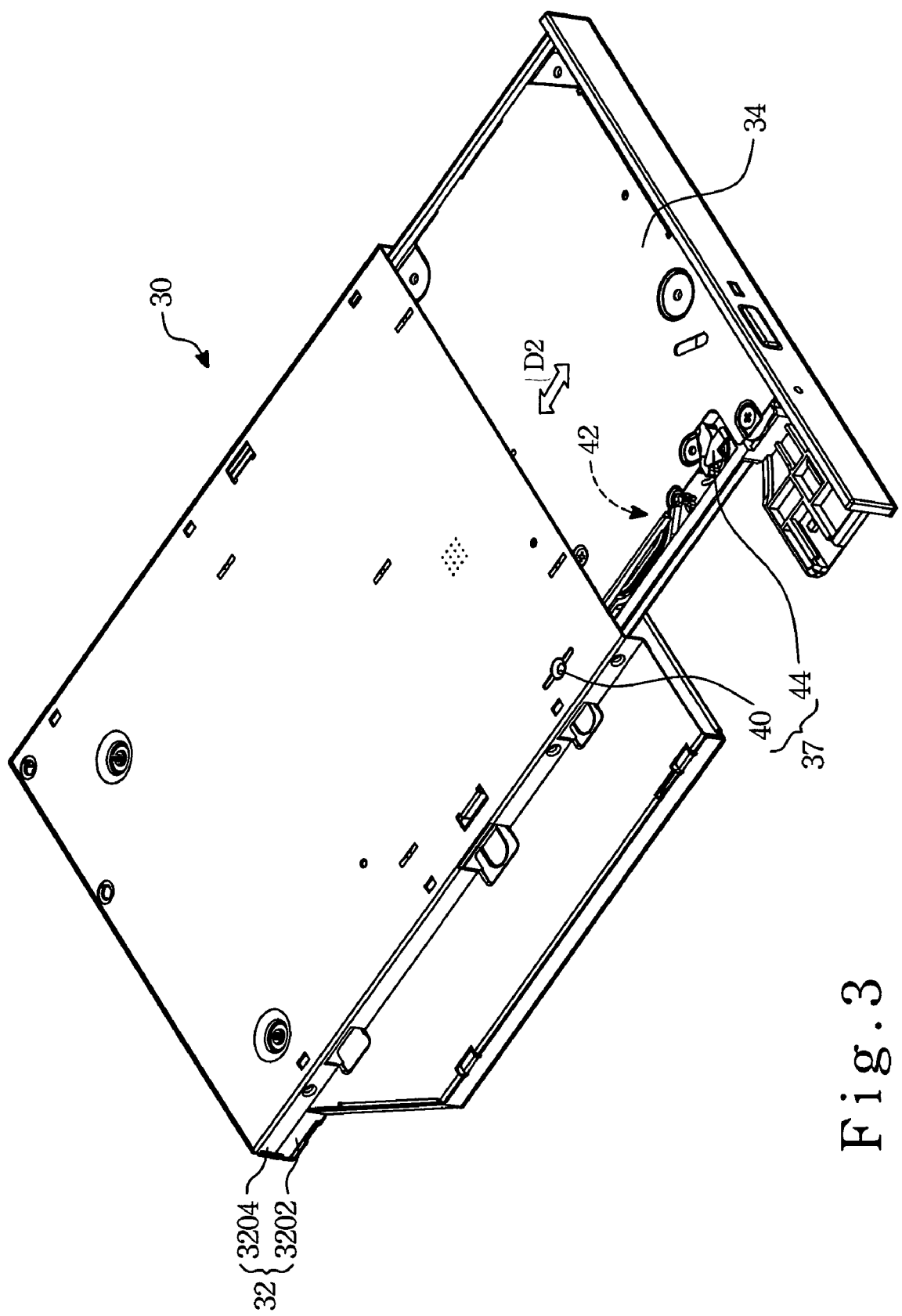
FIG. 3 is a bottom side view of the optical recording and reproducing apparatus of the present invention.

FIG. 3 is a bottom perspective view of the slim-type optical recording and reproducing apparatus 30 of the present invention. The apparatus 30 accordingly includes an outer casing 32 formed by upper and lower casing halves 3202, 3204 and a disk tray 34. The outer casing 32 defines a tray-receiving compartment and an entrance for access into the compartment. The outer casing 32 further defines a tray moving direction D2. The disk tray 34 is disposed within the compartment and is movable along the tray moving direction D2 between a retracted position, in which the disk tray 34 is retracted into the outer casing 32, and an extended position, in which the tray 34 is protruded outwardly from the outer casing 32 via the entrance. Some electronic components, such as a spindle motor for rotating the disk, and a pickup head for reading the disk during rotation, are disposed on the disk tray 34. The disk tray 34 is formed with a guiding groove 42 along one peripheral side thereof. Since the structure of these components is not relevant to the present invention, a detailed description thereof is omitted herein for brevity sake.

A positioning structure 37 is employed in the optical recording and reproducing apparatus of the present invention. The positioning structure 37 includes a locking member 40, a support member 54 and a lock-fastening member 44. The locking member 40 is fixed on the lower casing half 3204 of the outer casing 32, and extends into the guiding groove 42 of the, disk tray 34.

Figure 4:
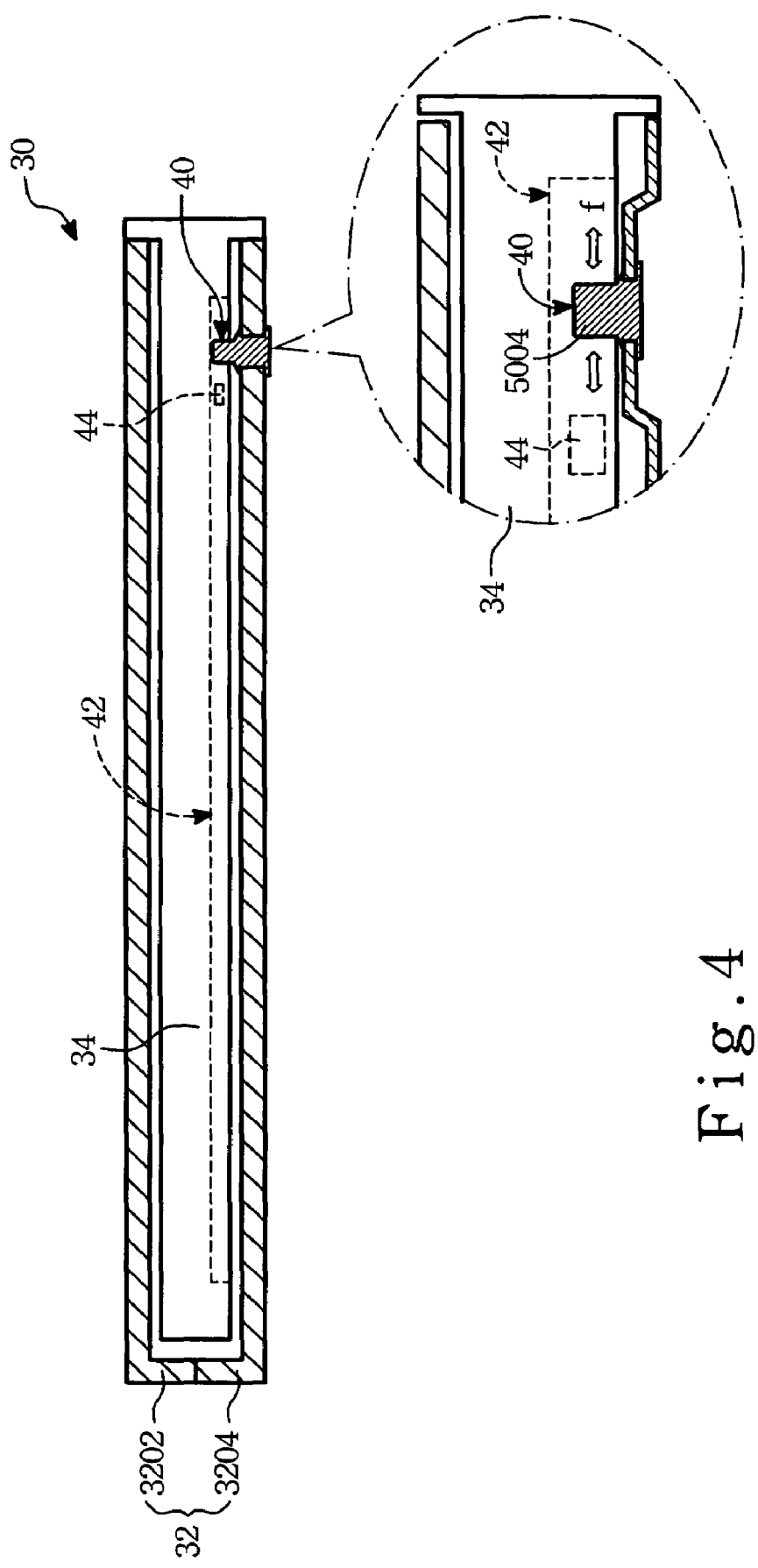
FIG. 4 is a sectional side and enlarged view illustrating a positioning structure of the optical recording and reproducing apparatus of the present invention.

Referring to FIG. 4, the locking member 40 can be a pin 50 that has a pillar portion 5004 extending into the guiding groove 42 in the disk tray 34. The lock-fastening member 44 is disposed on the disk tray 34 adjacent to the front end thereof, and has a hooking part for hooking the pillar portion 5004 of the locking member 40 when the disk tray 34 is withdrawn into the retracted position. Under this condition, reading operation of the disk placed on the disk tray 34 can be conducted.

When it is required to remove the disk tray 34 from the outer casing 32, the lock-fastening member 44 is activated to result in disengagement between the pillar portion 5004 of the pin 50 and the hooking part of the lock-fastening member 44, thereby permitting the tray 12 to move from the retracted position to the extended position.

Figure 5:
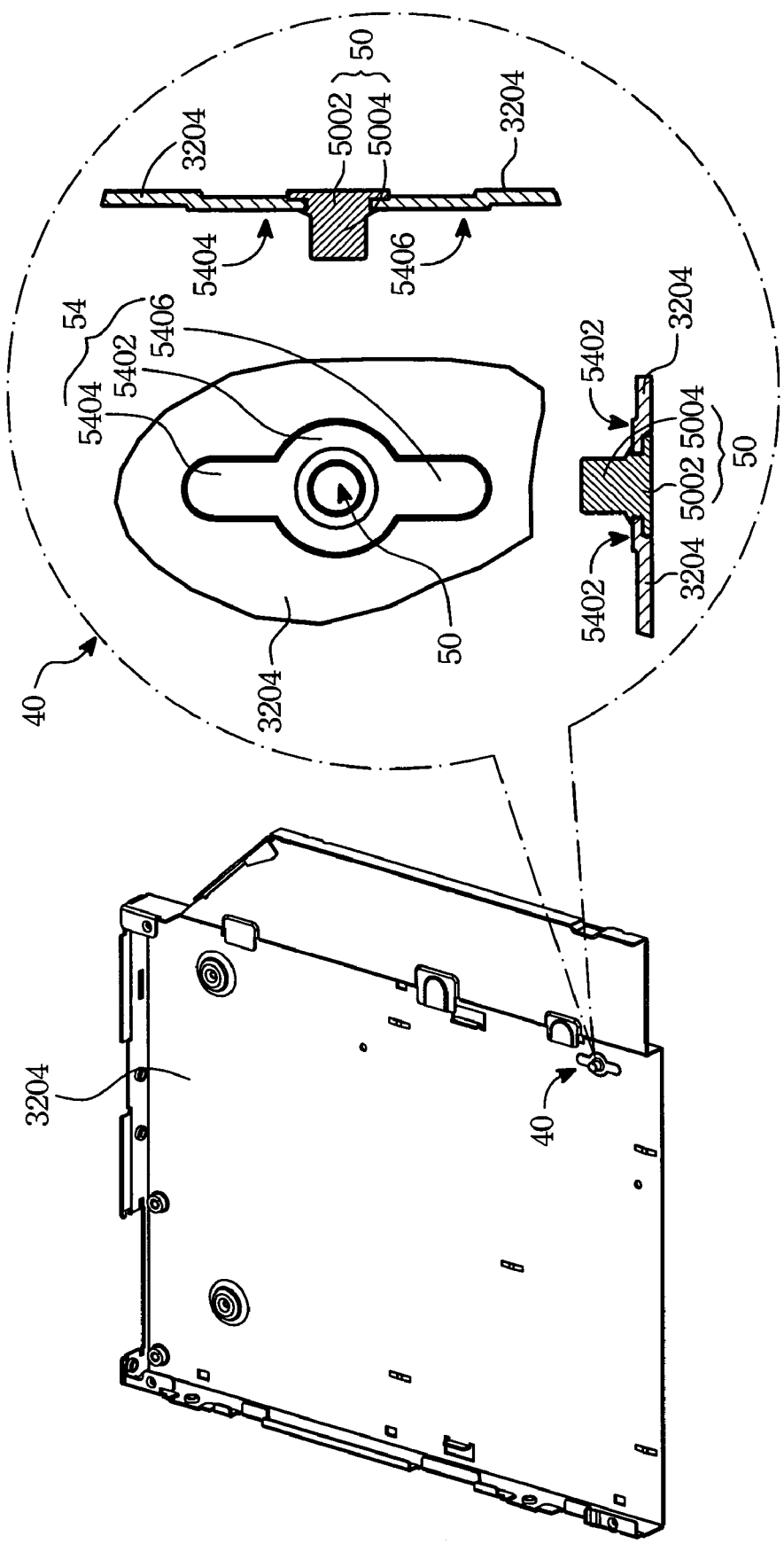
FIG. 5 is a partly exploded and enlarged view illustrating one embodiment of the positioning structure in the optical recording and reproducing apparatus of the present invention.

Referring to FIG. 5, in one embodiment of the present invention, the pin 50 includes a head 5002 fixed within a hole in the lower casing half 3204 and the pillar portion 5004. The support member 54 is disposed on the lower casing half 3204, and the head 5002 of the pin 50 is fixed on the support member in such a manner that the pillar portion 5004 extends upwardly into the guiding groove 42 in the disk tray 34 for engaging the hook part of the lock-fastening member 44, thereby positioning the tray 34 stationarily at the retracted position. Note that in this embodiment, a protrusion portion of the lower casing half 3204 surrounding the pin 50 and extending in the moving direction D2 defines the support member 54.

The support member 54 includes an annular base portion 5402 surrounding and immobilizing the pin 50 and first and second rib portions 5404, 5406 extending from two opposite ends of the annular base portion 5402 along the tray moving direction D2. The support member 54 is formed by punching the peripheral portion of the hole receiving the head 5002 of the pin 50. Since the first and second rib portions extend in the tray moving direction D2, deformation at the pillar portion 5004 and the annular base portion 5402 of the support member 54 is prevented even though the pillar portion 5004 is collided by the hooking part of the lock-fastening member 44 with a force f for opposing the ejecting force of the tray 34.

Figure 6:
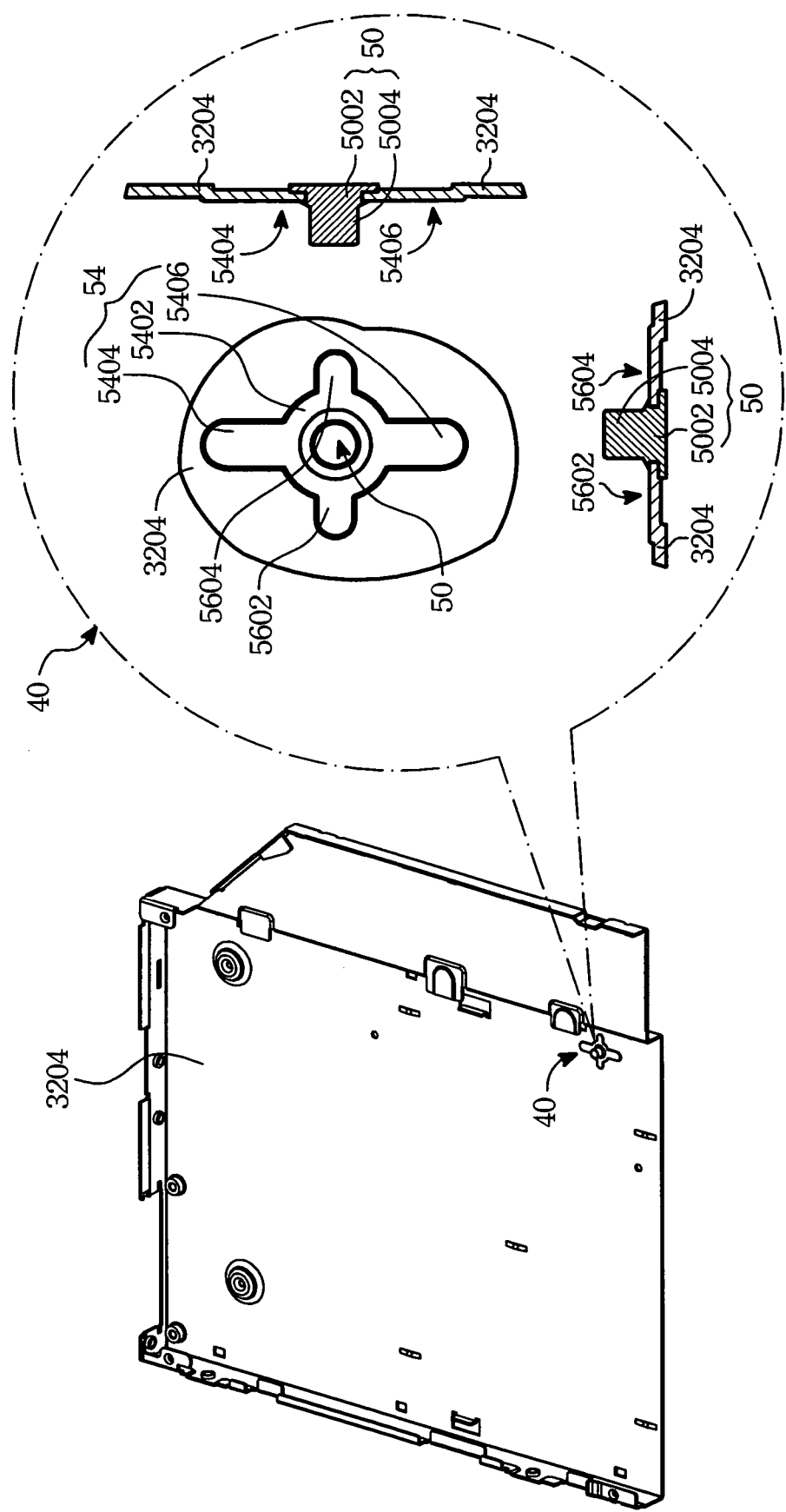
FIG. 6 is a partly exploded and enlarged view illustrating another embodiment of the position structure in the optical recording and reproducing apparatus of the present invention.

FIG. 6 is another embodiment of the recording and reproducing apparatus of the present invention, and has the structure similar to the previous embodiment. The only difference resides in that the support member 54 further includes third and fourth rib portions 5602, 5604 extending from another two opposite ends of the annular base portion 5402 in a direction transverse to the tray moving direction D2. The third and fourth rib portions 5602, 5604 are also formed by punching operation. Since the four rib portions support the pillar portion of the pin 50 at four lateral sides of the annular base portion 5402, the stability and position of the pillar portion is enhanced.

Summarizing the abovementioned paragraphs, since the support member 54 is formed by punching operation, the manufacturing cost can be a relatively cheap. In addition, since the positioning structure used in the recording and reproducing apparatus of the present invention can last longer when compared to the prior one, the service life of the present recording and reproducing apparatus is consequently prolonged.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A positioning structure used in a device to prevent movement of a movable member therein, the device including an outer casing receiving the movable member therein, the positioning structure comprising:
   a locking member adapted to be fixed on the outer casing; and
   a support member for immobilizing said locking member with respect to the outer casing in such a manner that said locking member extends upwardly into the outer casing to prevent movement of the movable member with respect to the outer casing;
   wherein, said support member includes an annular base portion surrounding said locking member and first and second rib portions extending from two opposite ends of said annular base portion in the moving direction of the movable member.

2. The positioning structure according to claim 1, wherein the outer casing is formed with a pin hole, said locking member being a pin that has a head fixed within the pin hole in the outer casing and a pillar portion extending from said head into the outer casing.

3. The positioning structure according to claim 1, wherein a protrusion portion of the outer casing is punched in order to form said support member.

4. The positioning structure according to claim 1, wherein said support member further includes third and fourth rib portions extending from another two opposite ends of said annular base portion in a direction transverse to the moving direction of the movable member.

5. An optical recording and reproducing apparatus comprising:
   an outer casing having a tray-receiving compartment and an entrance for access into said compartment, said outer casing further defining a tray moving direction;
   a tray disposed within said outer casing and movable along said tray moving direction between a retracted position, in which said tray is retracted into said outer casing, and an extended position, in which said tray is protruded outwardly from said outer casing via said entrance; and a positioning structure including:

a locking member fixed on said outer casing, and a support member for immobilizing said locking member with respect to said outer casing in such a manner that said locking member extends upwardly into said outer casing to prevent movement of said tray with respect to the outer casing, thereby positioning said tray stationarily at said retracted position, wherein, said support member includes an annular base portion surrounding said locking member and first and second rib portions extending from two opposite ends of said annular base portion in said tray moving direction.

6. The optical recording and reproducing apparatus according to claim 5, wherein said position structure further includes a lock fastening member disposed on said tray and having a hooking part for detachably hooking said locking member at said retracted position in order to position said tray stationarily with respect to said outer casing.

7. The optical recording and reproducing apparatus according to claim 5, wherein said support member further includes third and fourth rib portions extending from another two opposite ends of said annular base portion in a direction transverse to said tray moving direction.

* * * * *